United States Patent [19]

Mertens et al.

[11] Patent Number: 4,796,875

[45] Date of Patent: Jan. 10, 1989

[54] HYDRAULIC MOUNTING

[75] Inventors: Theobald Mertens, Mainz; Jurgen Roos, Trebur, both of Fed. Rep. of Germany

[73] Assignee: General Motors Corporation, Detroit, Mich.

[21] Appl. No.: 112,277

[22] Filed: Oct. 26, 1987

[30] Foreign Application Priority Data

Jan. 17, 1987 [DE] Fed. Rep. of Germany ....... 3701264

[51] Int. Cl.$^4$ .............................................. F16F 9/342
[52] U.S. Cl. ............................... 267/140.1; 267/64.28; 267/218; 251/339
[58] Field of Search ............... 248/562; 267/120, 121, 267/140.1, 217, 218, 219, 64.28; 188/322.21; 137/223, 505.24; 251/339

[56] References Cited

U.S. PATENT DOCUMENTS

| | | | |
|---|---|---|---|
| 4,641,808 | 2/1987 | Flower | 267/140.1 X |
| 4,720,084 | 1/1988 | Hollerweger et al. | 267/140.1 X |

FOREIGN PATENT DOCUMENTS

| | | | |
|---|---|---|---|
| 0115417 | 1/1984 | European Pat. Off. | 267/140.1 |
| 3210731 | 10/1983 | Fed. Rep. of Germany | 267/140.1 |
| 3447746 | 7/1986 | Fed. Rep. of Germany | 267/140.1 |
| 0144839 | 8/1984 | Japan | 267/140.1 |

Primary Examiner—Duane A. Reger
Attorney, Agent, or Firm—R. L. Phillips

[57] ABSTRACT

A hydraulic mounting has a nozzle plate with a membrane separating a working chamber from an equalizing chamber and a ring channel connecting these chambers. A filler channel leads radially from the outside into this ring channel and makes it possible to fill the hydraulic mounting, without air bubbles, with hydraulic fluid. A closure member closes off the filler channel on the outside.

4 Claims, 4 Drawing Sheets

HYDRAULIC MOUNTING

TECHNICAL FIELD

This invention refers to a hydraulic mounting with a nozzle body which has between two stop plates, a flexible disc separating a working chamber filled with hydraulic fluid from an equalizing chamber, and in addition, outside the region of the disc, a helical ring channel connecting the working chamber to the equalizing chamber.

BACKGROUND OF THE INVENTION

In hydraulic mountings such as that disclosed in European Patent 0 040 290, the length of the ring channel in the nozzle body can be altered before the nozzle is assembled by twisting the stop plates with respect to one another. In this way, the damping characteristics of the hydraulic mounting containing the nozzle body can be adjusted. To ensure that no air bubbles are incorporated into the hydraulic mounting that could affect the damping properties, the mounting is normally assembled while submersed in a tank of hydraulic fluid. And this presents problems of handling and fluid (gas) exposure.

SUMMARY OF THE INVENTION

The basic problem underlying the invention is that of configuring a hydraulic mounting of the type mentioned above so that filling can be performed without the use of a dip tank, with no risk of detrimental inclusion of air bubbles.

According to the invention, this problem is solved by the ring channel having a filler channel that leads radially to the outside and can be sealed with a closure member.

It has been found that by means of such a filler channel, air bubbles can be reliably driven out of the hydraulic mounting at a sufficiently high filling rate as a result of the turbulence which then occurs, so that optimum deaeration occurs. Previous studies in which the hydraulic mounting was filled through a channel in the rubber body did not produce satisfactory results, since air bubbles always remained in the ring channel. However, it is precisely the absence of air bubbles in the ring channel that is critical; otherwise air bubbles can be present, especially if the hydraulic mounting has an equalization chamber with a flexible membrane, which air can contact without causing damage. However, when fluid equalization occurs between the equalization chamber and the working chamber below the elastomer portion of the hydraulic mounting, no air must pass through the ring channel, since otherwise the important properties of the ring channel will be compromised.

One advantageous embodiment of the invention lies in the closure member being additionally constructed as a throttle member for varying the free flow cross-section of the ring channel. Because of this configuration, the properties of the ring channel can be varied. This also provides the possibility of adjusting the hydraulic mounting after assembly. This is primarily advantageous because the damping characteristics of hydraulic mountings can change as they age. With the configuration according to the invention, such changes can be compensated for by adjusting the throttle member.

Furthermore, it has been found that a closure member can be especially easily configured with a throttle member if it is a threaded pin which can be tightly screwed into an internal thread of the filler channel and which extends to a greater or lesser extent into the ring channel, depending on the depth to which it is screwed in.

Another very simple embodiment has the closure member provided with a throttle valve that can be inserted in the ring channel.

It was also found that the throttle valve can be inserted into the filler channel from the outside together with the closure member by elongating the filler channel to correspond to the width of the throttle valve.

Such an elongated filler channel can easily be tightly sealed if, in accordance with another embodiment of the invention, the closure member has a flexible head that is tightly insertable into the filler opening of the filler channel.

The throttle valve is especially easy to adjust by forming the closure member as a sealing body that is insertable into the filler opening and through which a shaft of the throttle vale extends.

It was also found advantageous in terms of manufacturing engineering to hold the throttle valve with a shaft in the filler channel, and have the closure member as a separate closure plug inserted into the filler opening.

It was also found advantageous to have the filler channel extend between stop plates, and have the stop plates comprise recesses which overlap projecting region of the main body of the hydraulic mounting. As a result, the stop plates are aligned correctly with one another and in a predefined position with reference to the main body. When the hydraulic mounting is installed in a correspondingly correct position, this prevents a deformed elastomeric member from covering the inlet opening of the ring channel, as in the case of a tilted hydraulic mounting placement.

The means for forcing the stop plates to be in alignment can be configured in an especially easy manner by forming each of the projections as a tapered region of the main body of the hydraulic mounting which forms the filler opening.

DESCRIPTION OF PREFERRED EMBODIMENTS

Figure 1:
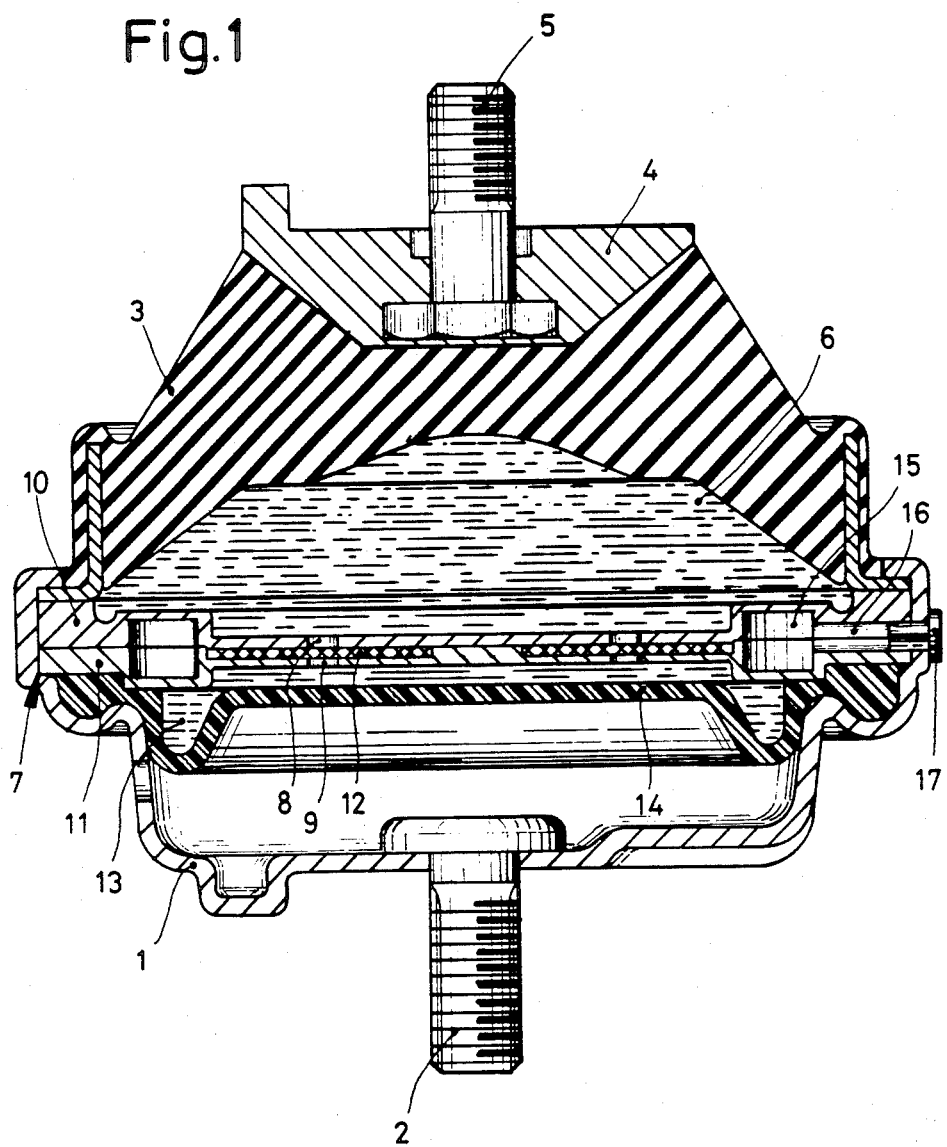

The invention admits of many embodiments. To elucidate them further, several of them are illustrated in the drawings and will be described below.

In FIG. 1, a cross section through a motor vehicle engine hydraulic mounting with the nozzle body according to the invention.

Figure 2:
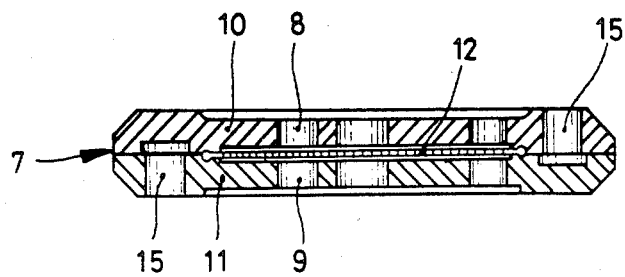

In FIG. 2, a cross section through a nozzle body according to the invention.

Figure 3:
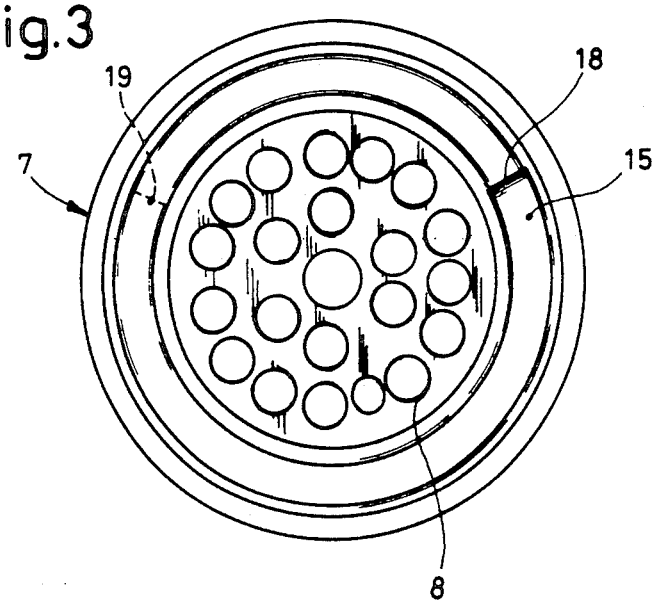

In FIG. 3, a top view of the nozzle body according to FIG. 2.

Figure 4:
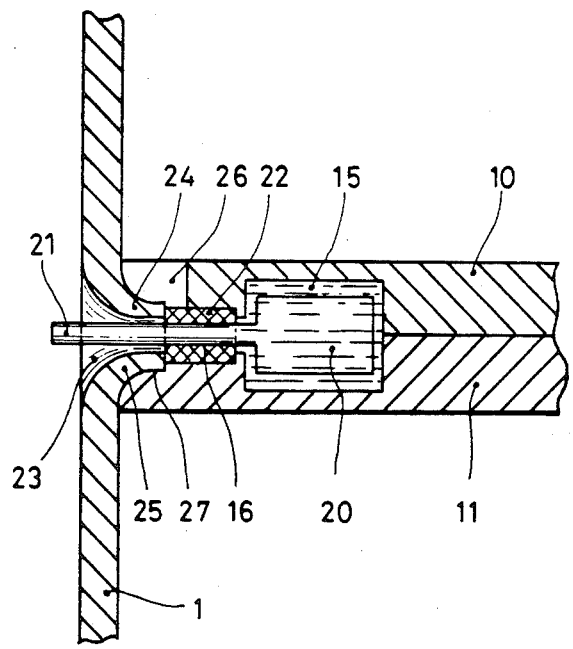

In FIG. 4, a cross section through an edge region of a first embodiment of the hydraulic mounting.

Figure 5:
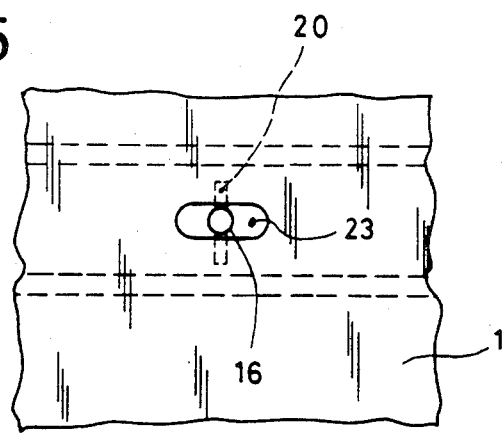

In FIG. 5, a view of the edge region shown in FIG. 4.

Figure 6:
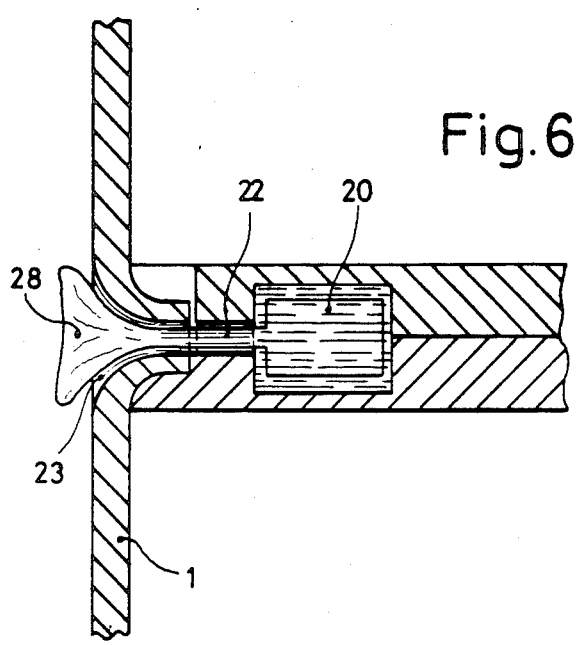

In FIG. 6, a cross section through an edge region of a second embodiment of the hydraulic mounting.

Figure 7:
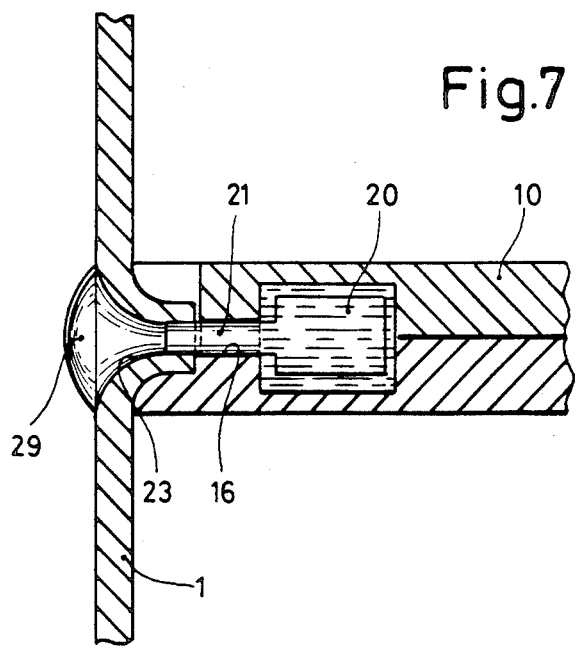

In FIG. 7, a cross section through an edge region of a third embodiment of the hydraulic mounting.

The hydraulic engine mounting shown in FIG. 1 has a main body 1 made of sheet steel with a threaded bolt 2 pointing downward by means of which it is bolted to an attachment point on a vehicle (not shown). As seen at the top of the drawing, an elastomer member 3 is secured on the main body 1 and carries a mounting plate 4 in which a threaded bolt 5, pointing upward, is held, for attaching the hydraulic mounting to, for example, a bracket on an engine (not shown).

The elastomeric part 3 defines the top of a working chamber 6 which is closed off at the bottom by a nozzle plate 7, which consists of two stop plates 10, 11 having openings 8, 9 between which plates a flexible membrane 12 is tightly clamped.

Located beneath the nozzle plate 7 is an equalizing chamber 13, which, like the working chamber 6, is filled with a hydraulic mounting fluid, and the bottom of which is defined by a rolled elastomeric membrane 14. A ring channel 15 in the nozzle plate 7 connects the working chamber 6 with the equalizing chamber 13 in a manner to be explained later. An important feature of the invention is a filler channel 16 that leads radially through the main body 1 into the nozzle plate 7 as far as the ring channel 15 and is closed off on the outside by a closure member 17. Through this filler channel 16 the hydraulic mounting can be filled with the hydraulic mounting fluid.

If the hydraulic mounting described is subjected to oscillations of small amplitude below a prescribed level, the membrane 12 oscillates correspondingly back and forth between the stop plates 10, 11. If oscillations of larger amplitude occur, hydraulic mounting fluid then flows out of the working chamber 6 through the ring channel 15 into the equalization chamber 13.

FIGS. 2 and 3 illustrate the configuration of the nozzle plate 7. FIG. 2 in turn shows the stop plates 10, 11 with the membrane 12 clamped between them. The ring channel 15 is also shown there. The cross-sectional illustration, however, is rotated through 90 degrees as compared to FIG. 1, so that the filler channel 16 cannot be perceived. This is to show that the ring channel 15 emerges up out of the stop plate 10 in the right part of the figure and down out of the stop plate 11 in the left part of the figure. This ring channel 15 thus helically connects the working chamber 6 with the equalization chamber 13. This may be clearly seen from FIG. 3, where one channel opening 18 is positioned on the top and one channel opening 19 on the bottom of the nozzle plate 7.

The enlarged cross-sectional illustration in FIG. 4 shows that the ring channel 15 is made up of recesses in the upper and lower stop plate 10, 11. In it is located, in the region of the filler channel 16, a throttle valve 20 which has a shaft 21 that leads through a closure member 22 closing off the filler channel 16 from the outside. By this means, it is easily possible to adjust the throttle valve 20 from outside.

FIG. 4, furthermore, illustrates a filler opening 23 in the main body 1, which is formed by wall regions 24, 25 which are tapered toward the inside and lead to the filler channel 16. Recesses 26, 27 in the stop plates 10, 11 overlap these regions 24, 25, so that their position relative to one another and to the main body 1 is fixed.

FIG. 5 illustrates that the filler opening 23 is elongated in shape, so that the throttle valve 20 can be inserted through it and the filler channel 16 into the ring channel 15.

The embodiment according to FIG. 6 differs from those previously described in that the throttle valve 20 is configured in one piece with the closure member 22. This closure member 22 has at its free end a plug 28 which, after adjustment of the throttle valve 20, is tightly pressed into the filler opening 23 so that the hydraulic mounting is sealed toward the outside.

In FIG. 7, the shaft 21 of the throttle valve 20 is not guided out of the filler channel 16, but rotatably mounted therein. The filler opening 23 is sealed by means of a separate plug 29 which fits in the filler opening 23. After removal of this plug 29, the shaft 21 can be rotated and the throttle valve 20 can thereby be adjusted.

Not illustrated is an embodiment according to which the filler channel 16 comprises an internal thread into which a threaded pin is tightly screwed from the outside; this pin can reach into the ring channel 15. Various degrees of throttling in the ring channel can be achieved with this embodiment by screwing the threaded pin a greater or lesser distance into the ring channel 15. Various degrees of throttling in the ring channel can be achieved with this embodiment by screwing the threaded pin a greater or lesser distance into the ring channel 15.

The foregoing description of the preferred embodiments of the invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A hydraulic mounting having two chambers filled with a liquid and separated by a flexible disk, a pair of stop plates sandwiching the disk, a helical channel outside the region of the disk connecting the chambers, a filler opening leading from the channel to outside the mounting, a closure member comprising a sealing body sealingly inserted in the opening, and a throttle valve in the channel having a shaft extending out through the sealing body.

2. A hydraulic mounting according to claim 1, further characterized by the throttle valve being held by the shaft in the channel, and the sealing body being a separate plug inserted in the opening.

3. A hydraulic mounting according to claim 2, further characterized by the filler opening extending between the stop plates, the stop plates having recesses which overlap projections of a mounting plate forming part of the mounting.

4. A hydraulic mounting according to claim 3, further characterized in that the projections are formed by tapered regions of the mounting plate which also form the filler opening.

* * * * *